126,418

UNITED STATES PATENT OFFICE.

THOMAS SEWELL, OF WASHINGTON, ASSIGNOR TO FREDERICK P. SAWYER, OF GEORGETOWN, DISTRICT OF COLUMBIA.

IMPROVEMENT IN COMPOSITIONS FOR DEODORIZING AND PREPARING FERTILIZERS.

Specification forming part of Letters Patent No. 126,418, dated May 7, 1872; antedated April 23, 1872.

Be it known that I, THOMAS SEWELL, of Washington, in the District of Columbia, have made a new and useful Improvement in Deodorizers and Fertilizers, of which the following is a specification:

Specification describing a new and improved deodorizer and fertilizer, invented by THOMAS SEWELL, of Washington, District of Columbia.

The nature of my invention relates to a new and improved compound to be used in connection with ordinary dry earth, clay, or soil in order to increase its deodorizing and disinfecting properties, and rendering the mixture of said clay and fecal or other organic matter resulting from its use as a disinfectant more valuable as a fertilizer.

In carrying out my invention, I take crude carbolic acid and crude perchloride of manganese, or other equivalent perchloride, excepting perchloride of iron, which would injure the fertilizing properties of the mass after use. The proportions of these substances may be varied to suit the nature of the use for which the compound is intended; but, in most cases, I prefer to use equal parts of the carbolic acid and a saturated solution of the perchloride. I then take well-burnt and ground peat charcoal and add this compound to it until it is completely saturated, after which I add perfectly-dried earth, clay, or soil in various proportions, as may be desired, after which my disinfectant is completed.

This disinfectant is particularly intended as a substitute for the ordinary dry clay, earth, or soil commonly used in earth-closets, privies, cess-pools, &c.; and its advantages are apparent at a glance.

The carbolic acid acts to prevent putrefaction and decomposition, and the perchloride of iron to destroy and render innocuous any matter that has already decomposed, besides fixing the volatile ammoniacal compounds of the fecal matter to be disinfected by forming chloride of ammonium, (a non-volatile salt,) which will remain in the mass. The peat charcoal acts as an absorbent, and also as a valuable fertilizing agent, and the clay supplies silica and alumina to the growing plants when the mass is applied as a fertilizer.

Having described my invention, what I claim is—

The compound herein described, consisting of carbolic acid, perchloride of manganese, and peat charcoal, in combination with clay, earth, or soil, as herein described.

THOS. SEWELL.

Witnesses:
 EDM. F. BROWN,
 O. L. COOMBS.